United States Patent [19]
Weihrauch

[11] Patent Number: 5,815,874
[45] Date of Patent: Oct. 6, 1998

[54] BRUSH WITH FOAMED PLASTICS HANDLE

[75] Inventor: Georg Weihrauch, Wald-Michelbach, Germany

[73] Assignee: Coronet-Werke GmbH, Wald-Michelbach, Germany

[21] Appl. No.: 689,918

[22] Filed: Aug. 16, 1996

[30] Foreign Application Priority Data

Aug. 16, 1995 [DE] Germany .................. 195 30 057.2

[51] Int. Cl.⁶ ...................................... A46B 5/02
[52] U.S. Cl. ..................... 15/159.1; 15/143.1; 15/167.1
[58] Field of Search .................. 15/143.1, 167.1, 15/159.1

[56] References Cited

U.S. PATENT DOCUMENTS

| | | | |
|---|---|---|---|
| 2,244,098 | 6/1941 | Busick | 15/167.1 |
| 4,283,808 | 8/1981 | Beebe | 15/167.1 |
| 4,691,718 | 9/1987 | Sakuma et al. | 15/167.1 |
| 4,780,924 | 11/1988 | Hansen et al. | 15/167.1 |
| 5,272,784 | 12/1993 | Levin | 15/143.1 |

FOREIGN PATENT DOCUMENTS

| | | | |
|---|---|---|---|
| 1171869 | 6/1964 | Germany | 15/167.1 |
| WO 89/10076 | 11/1989 | WIPO | 15/167.1 |

*Primary Examiner*—Terrence Till
*Attorney, Agent, or Firm*—Antonelli, Terry, Stout, & Kraus, LLP

[57] ABSTRACT

A brush with a one-piece plastic brush body produced by injection moulding comprises a head covered with bristles and a dimensionally stable handle with a larger cross-section than the head, the brush body being made from an elastomer mixed with a foaming agent and the plastic is foamed in an area of the handle and is solid in the area of the head. The brush is produced by injection moulding in a two-part mould. An elastomer and a foaming agent are mixed during moulding. The mould cross-section for forming the head is smaller than the mould cross section for forming the handle with the elastomer being only foamed in the area of the handle.

6 Claims, 1 Drawing Sheet

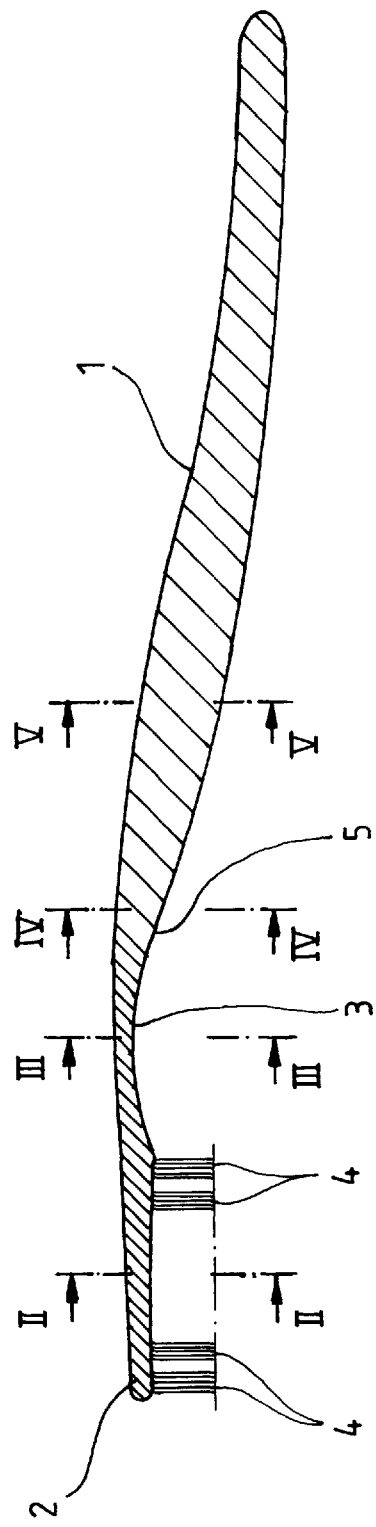
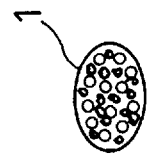
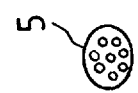
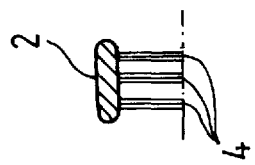

BRUSH WITH FOAMED PLASTICS HANDLE

BACKGROUND OF THE INVENTION

1. Field of the Invention

The Invention relates to a brush having a one-piece plastic brush body produced by injection moulding and comprising a head covered with bristles and a dimensionally stable handle having a larger cross-section than the head.

2. Description of the Prior Art

Nowadays brushes and in particular toothbrushes are made entirely from plastic. Due to a different requirement profile the bristles mainly comprise high-grade polyamide, processed by extrusion to thin fibres, which are then stretched and thermally stabilized. This makes it possible to attain the desired properties, namely high flexibility with a good re-erecting capacity, high fatigue limits, good abrasion resistance and chemical stability. However, the brush body is usually made from a less expensive plastic produced by injection moulding. The head area of the brush body must be so dimensioned as a function of the nature of the fixing of the bristles, that the latter, which are optionally combined in bundles, are adequately firmly anchored. However, the head must be as flat as possible so as to take up little space in the oral cavity or so as to be able to utilize the existing space with substantially extended bristles. The handle must be dimensionally stable and rigid. It is also desirable for the head to be somewhat flexible with respect to the handle in order to damp the pressing force during the cleaning of the teeth or to control the pressure. Therefore a smaller cross-section neck is provided between the head and the handle and gives the brush body a certain flexibility. The constriction resulting from the neck also fulfils an ergonomic function, in order to be able to guide the toothbrush in the desired cleaning movements with the mouth closed.

The thermoplastics mainly used for toothbrushes only very inadequately fulfil these opposing requirements. This more particularly applies for the desired flexibility between the head and the handle and the also the desired small cross-section at the head and neck. Therefore the cross-section in the area of the neck must be relatively large, so as not to break during use or any other extraordinary stressing. The same applies with respect to the head, because the latter is cross-sectionally weakened due to the fastening measures for the bristle bundles, particularly if, as is normally the case, the bundles are mechanically or thermally anchored or injected into holes in the head. Also when welding the bundles onto the head material weakening occurs, because the surface molecular structure on the head is disadvantageously modified.

To achieve the necessary flexibility of the head compared with the handle, use is made of multicomponent brushes, which have in the area of the neck inserted springs (DE 38 40 136, WO 93/115 627) or inserted, rubber elastic bodies (DE 39 23 495, BP 0 613 636). There are also proposals for arranging the flexibility in the neck area (DE 36 40 898), but these proposals leave it open as to how this is to be constructionally or technologically achieved.

SUMMARY OF THE INVENTION

The object of the invention is to propose a brush and a process for its production, which allow the use of a single, inexpensive plastics material, which allows an adequate flexibility in the area of the head and between the head and the handle. While at the same time giving a rigid construction in the area of the handle and which in particular in the case of toothbrushes satisfies the use requirement profile.

This object is achieved with the brush body being made from an elastomer mixed with a foaming agent and is foamed in the area of the handle, whereas it is substantially solid in the area of the smaller cross-section of the head.

Elastomers have the use advantage of being relatively soft which largely prevents any injury risk when use in oral and body hygiene. They have the ergonomic advantage of a relatively flush surface and therefore a good grip. Their obvious characteristics also include a good bending capacity with high breaking strength. Thus, although the material is obviously usable for the brush bodies, the bending capacity is disadvantageous, because the brush body must be greatly overdimensioned in the handle region in order to obtain a rigid handle. This would in turn lead to a corresponding material use in the case of an ergonomically non-optimum cross-sectional design. The invention solves this problem in that the elastomer is mixed with a foaming agent, which during injection moulding leads to the melt swelling in the areas having a larger cross-section, but in the area with narrower cross-sections the foaming agent dots not or only evolves to an insignificant extent. This leads to a brush body, which has a solid construction in the area of the head, so that the elastomer has there its favourable bending characteristics, whereas in the area of the handle, due to the pore volume, the bendability is largely eliminated. Thus, in the handle region standard cross-sections can be obtained. As a function of the degree of foaming, the material requirement in the foamed area is 20 to 50% lower than with a solid construction and the weight of brush is reduced. It is particularly advantageous that the advantages hitherto attainable only in multicomponent constructions can now be achieved with a single elastomer with the same or a smaller material use.

As a result of the solid construction of the head the bristles or bundles can be anchored in any random, conventional fixing procedure to the head.

The aforementioned principle of the invention can be implemented on any brush, but preferably on toothbrushes, in which the handle is connected to the head by means of a neck and only the handle is foamed and is therefore dimensionally stable, whereas the bending elastic neck allows a deflection of the head and the head can also bend out in a convex or concave manner.

In the case of toothbrushes, the invention also proposes that between the head or neck and handle there is a transition area with constantly increasing cross-section and the pore volume of the elastomer foamed in the area of the handle constantly decreases in the transition area to the neck.

This ensures that there is an adequately stable zone between the neck and handle in which the pore volume constantly decreases from the handle to the neck, so that in the transition regions there can be no excessive notch stresses, which could lead to breakage.

In another advantageous construction, the brush body in the area of the head and/or the neck has a smooth, ultra-bright surface, whereas the brush body can have in the area of the handle a rough or structured surface.

The smooth, ultra-bright surface in the head and neck region leads to the desired slidability in the oral cavity. It also satisfies very well the hygienic requirements and favours the strength in the the areas of small cross-sections. A good grip is enhanced by the rough or structured surface in the handle region.

For the production of such a brush, the invention makes use of the known injection moulding process, where an at least two-part mould is used, which for forming the head or neck has smaller mould cross-sections than for forming the handle. According to the invention, this process is characterized in that the plastics material is constituted by an elastomer with a foaming agent and the mould cross-sections for the head or neck are so much smaller compared with those for the handle that the plastic is only foamed in the area of the handle.

Practical tests have shown that this requirement can be fulfilled with standard head and handle cross-sections. As a function of the shape of the brush body, a suitable arrangement of the injection points can support the desired result.

In the case of a toothbrush, whose brush body comprises a head, neck, handle and a transition area between them, the mould cross-sections of the head, neck, transition area and handle are so chosen that the plastic is essentially only foamed in the area of the handle and in the transition area, the pore volume gradually decreasing from handle to transition area.

According to the invention, another possibility for producing the brush comprises providing on the mould at least two injection channels, whereof the first issues into the head or neck and the second into the mould area forming the handle, and that the plastics material is constituted by an elastomer, which is supplied to the first injection channel in pure form and to the second injection channel mixed with a foaming agent.

This process, which can also be referred to as a counterpressure process, can be so controlled that the pure elastomer only fills the mould cavity for the head or neck, whereas the foaming elastomer only fills the mould cavity for the handle and in the transition area between the neck and handle a mixing takes place.

A variant of this process is characterized by the brush body being moulded in an injection mould with highly polished mould surfaces in the area of the head and/or neck, whereas the brush body is moulded in the area of the handle by means of rough or structure mould surfaces.

This permits the obtaining of a brush, whose surface fulfils different requirements in different areas, namely slidability on the one hand and a good grip on the other.

The process according to the invention offers the possibility as a result of the solid construction of the head of anchoring the bristles, which may be combined into bundles, using one of the standard fastening or fixing methods. Thus, the bristles, e.g. in channels of one of the two parts of the injection mould can be introduced projecting into the mould cavity and the injection moulding compound forming the brush body can be injected around them.

In connection with the injection moulding, on the head of the brush body holes can be made for receiving the bristles or bristle bundles and the bristles or bundles are then mechanically or thermally fixed therein.

As a function of the fixing procedure, it is advantageous if the bristles or bristle bundles are melted on their fastening-side and to a head with which they are then anchored in the brush body. This particularly offers advantages when injecting the brush body around the bundles, as is known per se.

Instead, the bristles or bundles can be provided with a head having a larger cross-section than the narrowest cross-section of the holes on the head and are pressed into the holes accompanied by bristle-parallel pressure, the elastic characteristics of the elastomer being utilized, which gives way under pressure and then firmly engages around the bundle head. Optionally, for this purpose the holes can be provided with undercuts.

The invention is described in greater detail hereinafter relative to an embodiment and the attached drawings, wherein show:

BRIEF DESCRIPTION OF THE DRAWINGS

FIG. 1 A longitudinal section through a toothbrush.

FIGS. 2 to 5 cross-sections 2—2 to 5—5 according to FIG. 1.

DESCRIPTION OF THE PREFERRED EMBODIMENT

The toothbrush shown in FIG. 1 comprises a handle, a head 2 and the intermediate neck 3, which passes into the handle via a transition area 5. The toothbrush is also covered with individual standing bristles or bundles 4 in the area of the head 2.

The bristle body is made from an elastomer, which is solid in the area of the head 2 and neck 3, whereas it is foamed by means of a foaming agent in the area of the handle, so that there the elastomer is more bendable. In the transition area 5 between the neck 3 and handle 1 the foaming agent only has a partial action, so that there there is a portion volume increasing towards the handle.

The cross-sectional path over the length of the brush body is apparent from FIGS. 2 to 5. In the area of the head (FIG. 2), a flat, but relatively wide cross-section is desired and in the area of the neck 3 (FIG. 3) it passes into the narrowest brush body cross-section. In the transition area (FIG. 4) the cross-section gradually increases again until it assumes the maximum cross-section in the area of the handle 1.

Whereas the elastomer is in solid from in the region of the head 2 and neck 3, in the transition area 5 with increasing cross-section there is an increasing pore volume, which reaches its highest value in the area of the handle 1. This is shown in FIG. 1 by hatching with increasing spacing and in FIGS. 4 and 5, compared with FIGS. 2 and 3, by corresponding cavities.

The bristles or bundles 4 can be mechanically or thermally inserted in preinjected holes of the head 2 or moulding around the sane can directly take place in the injection mould. These fixing methods are known and consequently require no further description here.

I claim:

1. A brush having an injection molded one-piece plastic brush body comprising:

a head covered with bristles and a dimensionally stable handle having a larger cross-section compared with a cross-section of the head, the brush body being made from an elastomer mixed with a foaming agent, the plastic being foamed in an area of the handle and substantially solid in an area of the head and having a transition area between the head and the handle having a constantly increasing cross-section with a pore volume of foamed plastic in an area of the handle constantly decreasing in the transition area toward the head.

2. A brush in accordance with claim 1 further comprising:

a neck with the transition area being disposed between the neck and the handle.

3. A brush according to claim 2, wherein the one piece plastic brush body has a smooth bright surface in an area of the head.

4. A brush according to claim 2, wherein the one piece brush has a smooth bright surface in an area of the head and neck.

5. A brush according to claim 1, wherein the brush body has a rough surface in an area of the handle.

6. A brush according to claim 1, wherein the brush body has a structured surface in an area of the handle.

* * * * *